US012688682B2

(12) United States Patent
Izawa et al.

(10) Patent No.: US 12,688,682 B2
(45) Date of Patent: Jul. 21, 2026

(54) TRAINING DEVICE, OBJECT DETECTION DEVICE, TRAINING METHOD, OBJECT DETECTION METHOD, AND NON-TRANSITORY COMPUTER-READABLE STORAGE MEDIUM

(71) Applicant: CANON KABUSHIKI KAISHA, Tokyo (JP)

(72) Inventors: Hidetoshi Izawa, Kanagawa (JP); Hayato Shimodaira, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 295 days.

(21) Appl. No.: 18/423,402

(22) Filed: Jan. 26, 2024

(65) Prior Publication Data

US 2024/0169709 A1 May 23, 2024

Related U.S. Application Data

(63) Continuation of application No. PCT/JP2022/024325, filed on Jun. 17, 2022.

(30) Foreign Application Priority Data

Aug. 13, 2021 (JP) ................................. 2021-132069
May 17, 2022 (JP) ................................. 2022-081074

(51) Int. Cl.
*G06V 10/82* (2022.01)
*G06V 10/74* (2022.01)
(Continued)

(52) U.S. Cl.
CPC .......... *G06V 10/776* (2022.01); *G06V 10/761* (2022.01); *G06V 10/82* (2022.01); *G06V 40/172* (2022.01)

(58) Field of Classification Search
CPC ..................... G06V 10/00–993; G06V 40/172
See application file for complete search history.

(56) References Cited

U.S. PATENT DOCUMENTS

2020/0175384 A1* 6/2020 Zhang .................... G06N 3/082
2020/0202533 A1* 6/2020 Cohen .................... G06T 7/194
(Continued)

FOREIGN PATENT DOCUMENTS

CN 110991468 A 4/2020
WO 2020/214580 A1 10/2020

OTHER PUBLICATIONS

Redmon, J. et al., "YOLO9000: better, faster, stronger" Proceedings of the IEEE conference on computer vision and pattern recognition (Jul. 2017) pp. 7263-7271.
(Continued)

*Primary Examiner* — Sean T Motsinger
(74) *Attorney, Agent, or Firm* — Carter, DeLuca & Farrell LLP

(57) ABSTRACT

A training device acquires a degree of similarity between a correct answer region indicating a region of an object in an image and each of a plurality of anchor boxes set in advance in an image, selects, among the plurality of anchor boxes, an anchor box for which the degree of similarity is greater than or equal to a predetermined threshold, for the correct answer region, and performs training of a neural network model for detecting the object, based on the correct answer region and the selected anchor box. If a maximum number of anchor boxes have been selected for the correct answer region, the training device changes the maximum number of the anchor boxes for the correct answer region based on the degrees of similarity acquired for the anchor boxes selected for the correct answer region.

19 Claims, 12 Drawing Sheets

(51) Int. Cl.
    *G06V 10/776*        (2022.01)
    *G06V 40/16*         (2022.01)

(56)           References Cited

U.S. PATENT DOCUMENTS

2023/0245240 A1 *   8/2023  Dev ........................ G06V 10/70
                                          382/103
2023/0260262 A1 *   8/2023  Martinez .............. G06V 10/751
                                          382/159
2023/0343128 A1 *  10/2023  Wang ..................... G06V 40/10

OTHER PUBLICATIONS

Yang, X., et al. "SCRDet: Towards more robust detection for small, cluttered and rotated objects" Proceedings of the IEEE/CVF International Conference on Computer Vision (Aug. 2019) pp. 8232-8241.

International Search Report issued by the Japan Patent Office on Sep. 6, 2022 in corresponding International Application No. PCT/JP2022/024325, with English translation.

\* cited by examiner

F I G. 2A
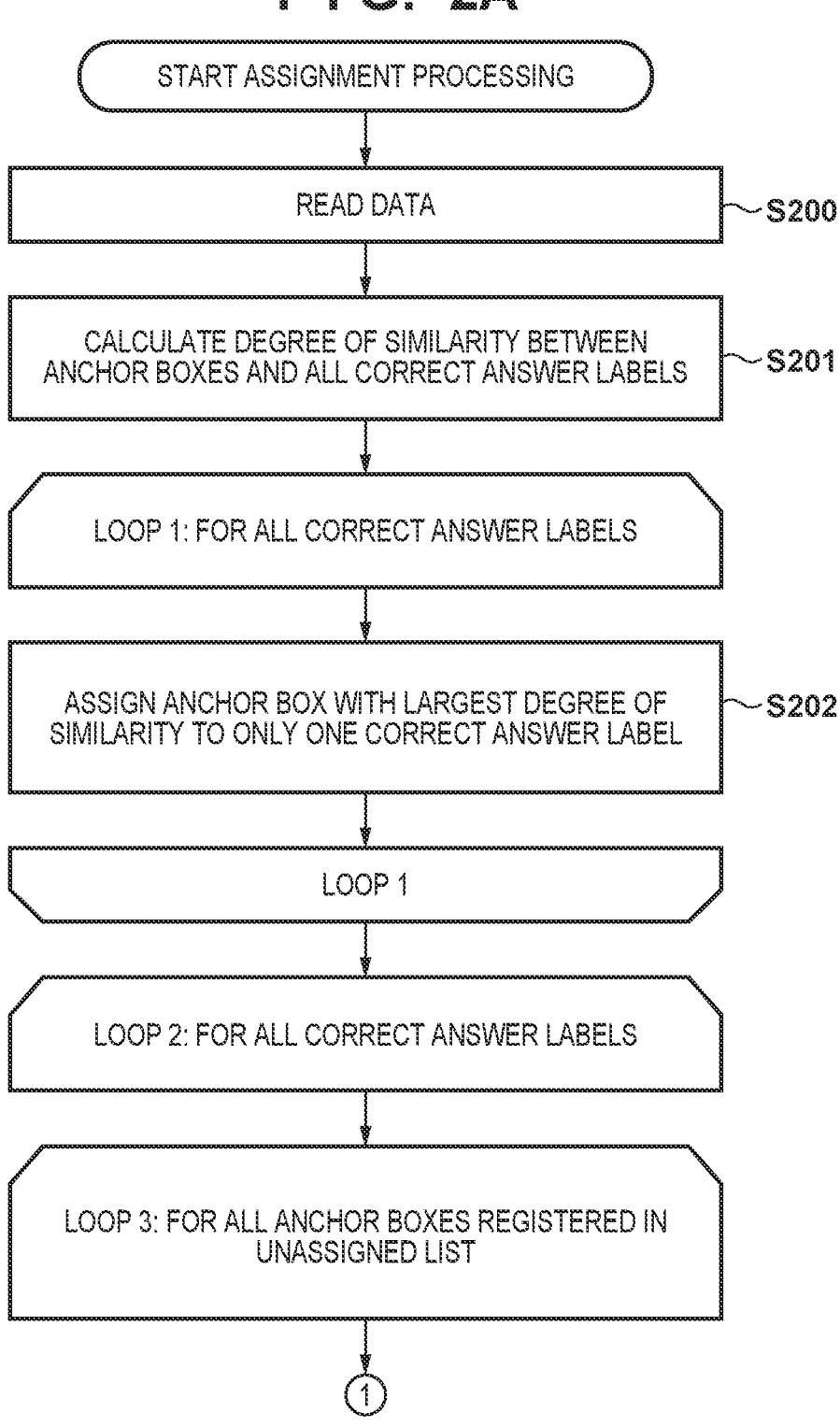

F I G. 2B
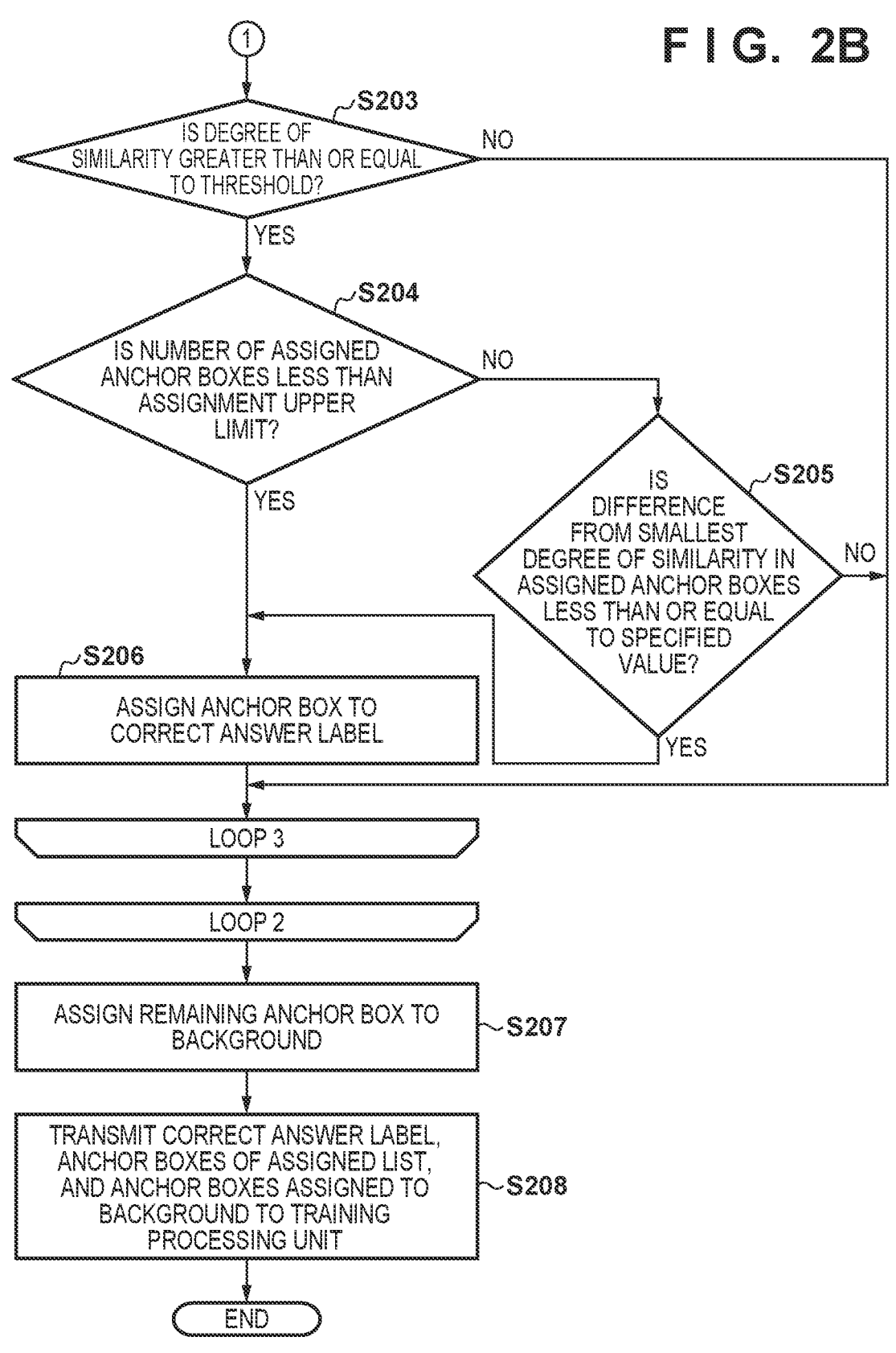

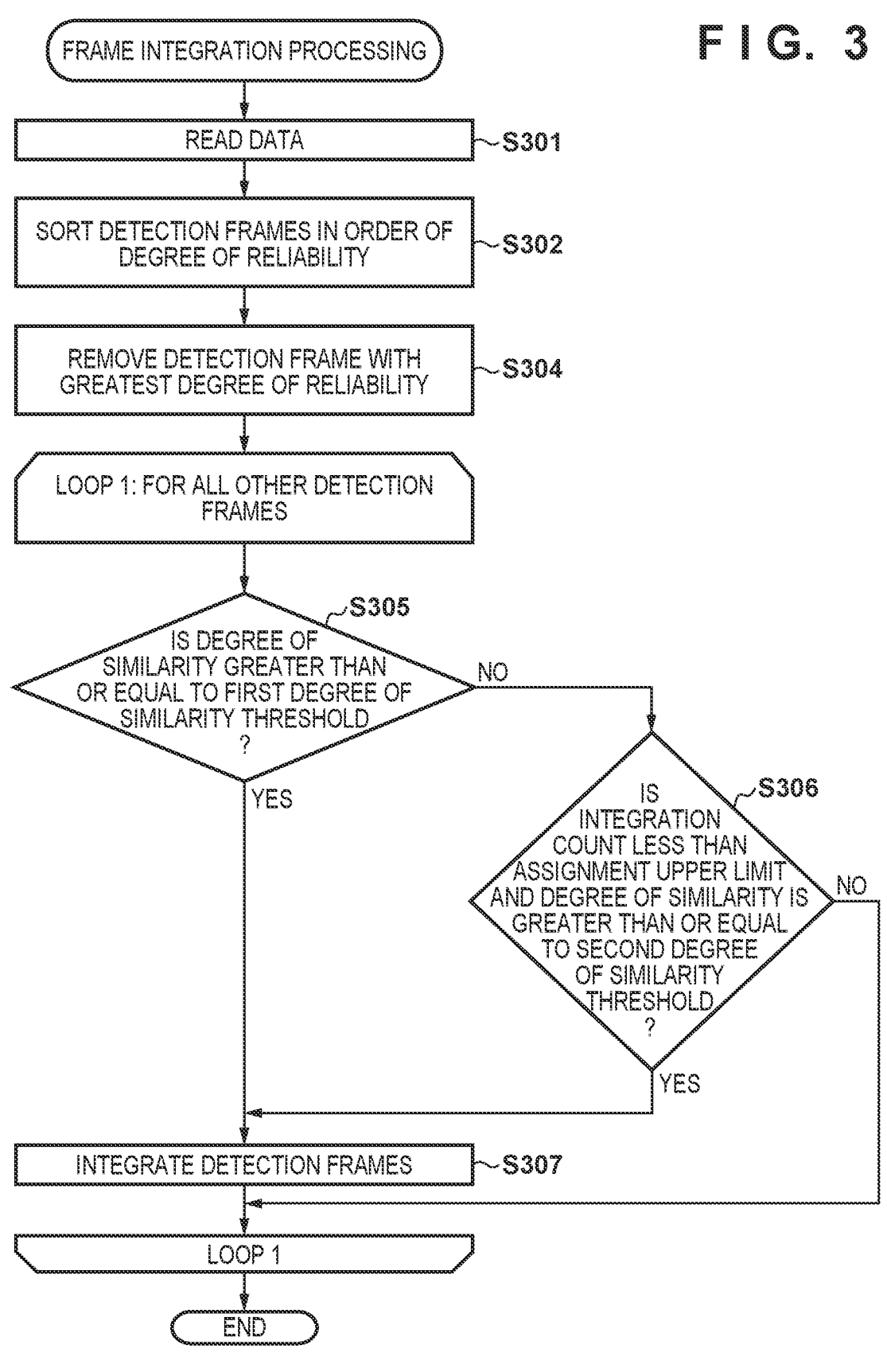
F I G. 3

F I G. 4A 410
411
412

F I G. 4B 421-1    421-2
420
421-3    421-4

F I G. 4C

| ANCHOR BOX | DEGREE OF SIMILARITY |
|---|---|
| 421-1 | 0.8 |
| 421-2 | 0.5 |
| 421-3 | 0.5 |
| 421-4 | 0.3 |

F I G. 6A
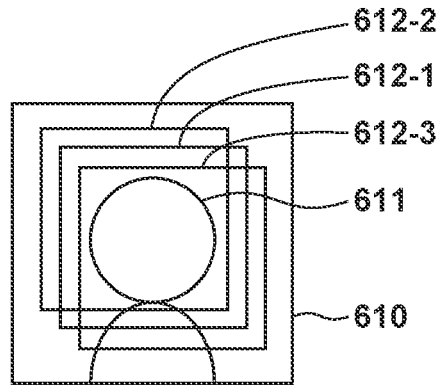
F I G. 6B
| DETECTION FRAME | DEGREE OF RELIABILITY |
|---|---|
| 612-1 | 0.9 |
| 612-2 | 0.7 |
| 612-3 | 0.7 |
F I G. 6C
| DETECTION FRAME | DEGREE OF SIMILARITY |
|---|---|
| 612-2 | 0.9 |
| 612-3 | 0.8 |

FIG. 7

701 — CPU

702 — RAM

703 — ROM

704 — OPERATION UNIT

705 — DISPLAY UNIT

706 — EXTERNAL STORAGE DEVICE

707 — I/F

708

F I G.  8A

FACE OF PERSON IN IMAGE OF
USAGE SCENE

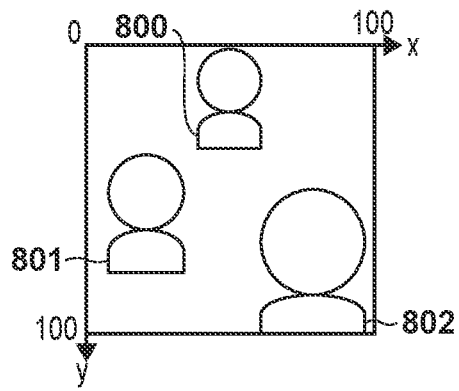

F I G.  8B

CENTER POSITION AND
VALUE OF SIZE OF FACE OF PERSON

| PERSON | CENTER (x,y) | SIZE |
|--------|--------------|------|
| 800 | (50,10) | 22 |
| 801 | (10,50) | 26 |
| 802 | (80,70) | 37 |

F I G.  8C

SIZE OF FACE IN IMAGE REGION

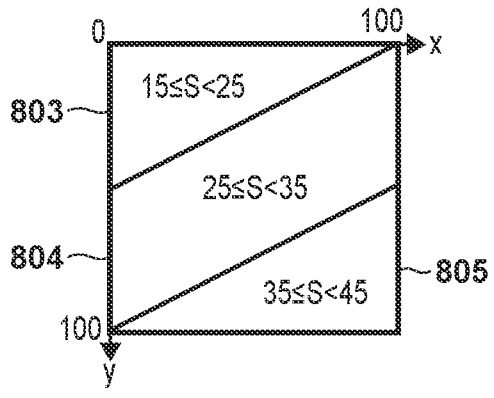

F I G.  8D

SIZE OF FACE AND
REFERENCE VALUE OF UPPER LIMIT NUMBER OF ANCHOR BOXES

| SIZE OF FACE | UPPER LIMIT NUMBER |
|--------------|--------------------|
| LESS THAN 15 | 5 |
| GREATER THAN OR EQUAL TO 15, LESS THAN 25 | 4 |
| GREATER THAN OR EQUAL TO 25, LESS THAN 35 | 3 |
| GREATER THAN OR EQUAL TO 35, LESS THAN 45 | 2 |
| GREATER THAN OR EQUAL TO 45 | 1 |

F I G. 9A
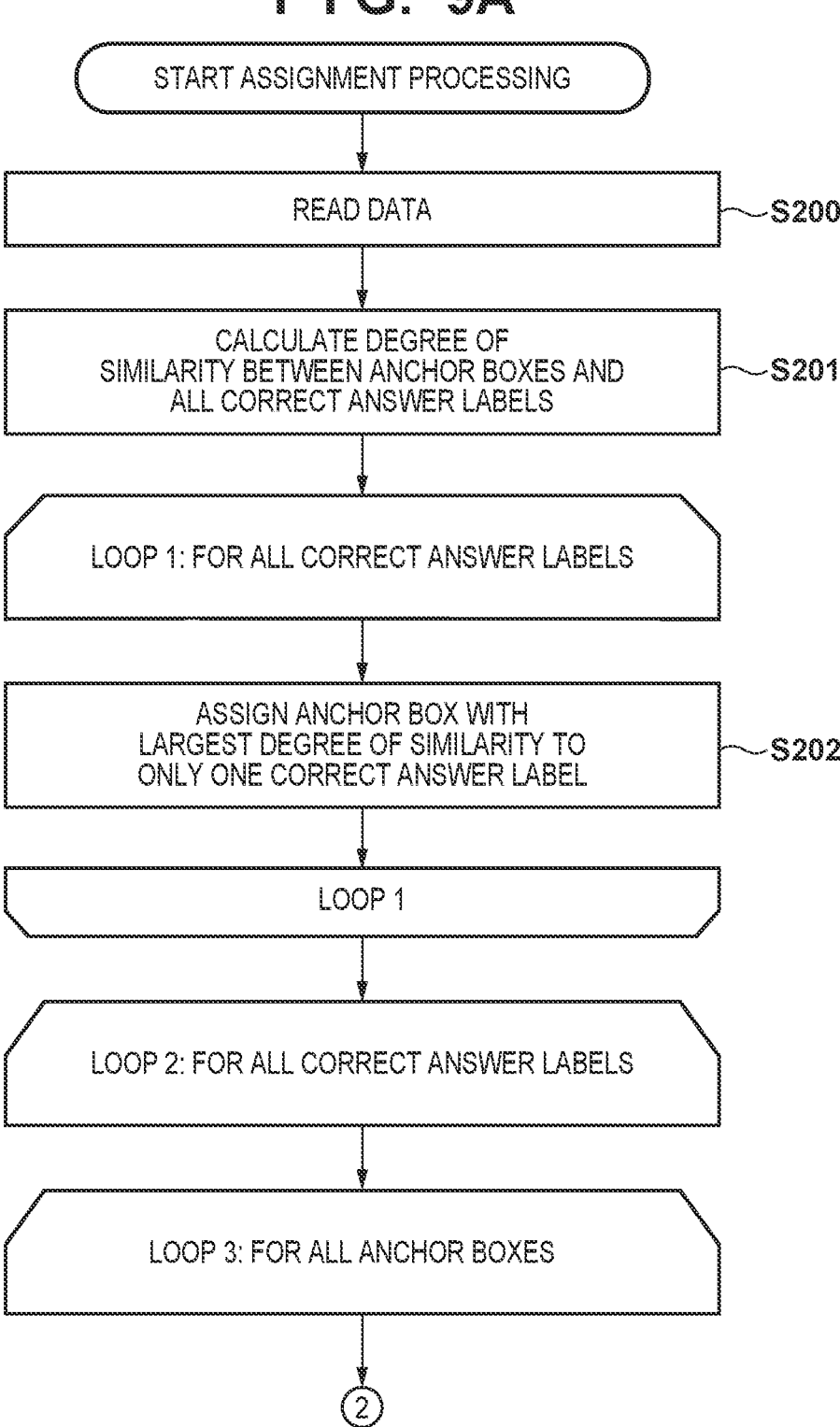

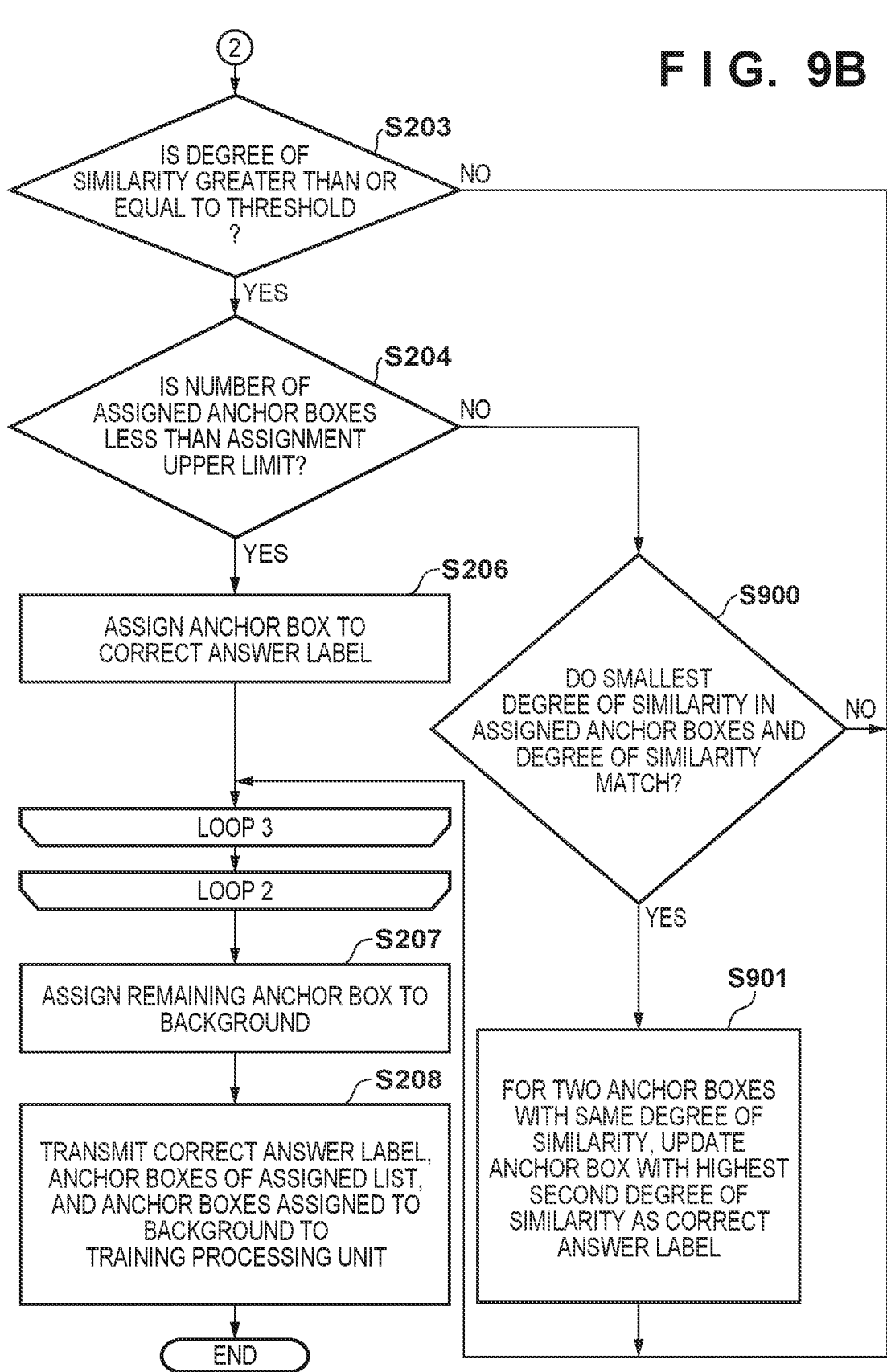
F I G. 9B

F I G.  10A
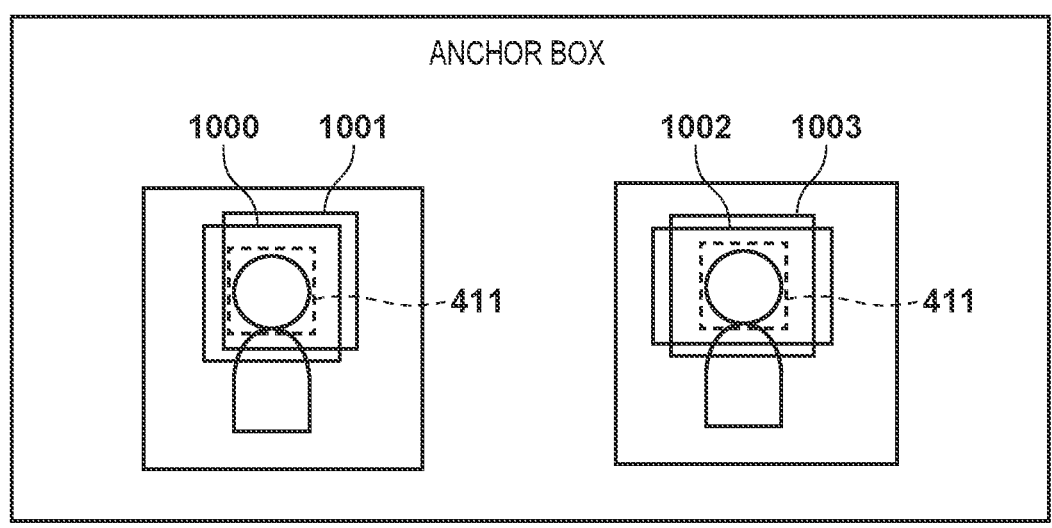
F I G.  10B
EXAMPLE OF SECOND DEGREE OF
SIMILARITY BETWEEN ANCHOR BOX AND CORRECT ANSWER LABEL
| ANCHOR BOX | FIRST SIMILARITY (IoU) | CENTER DISTANCE | SIZE DIFFERENCE | SUM OF CENTER DISTANCE AND SIZE DIFFERENCE |
|---|---|---|---|---|
| 1000 | 0.4 | 0 | 1 | 1 |
| 1001 | 0.4 | 0.5 | 1 | 1.5 |
| 1002 | 0.3 | 0 | 1.9 | 1.9 |
| 1003 | 0.3 | 0 | 1.3 | 1.3 |

TRAINING DEVICE, OBJECT DETECTION DEVICE, TRAINING METHOD, OBJECT DETECTION METHOD, AND NON-TRANSITORY COMPUTER-READABLE STORAGE MEDIUM

CROSS-REFERENCE TO RELATED APPLICATIONS

This application is a Continuation of International Patent Application No. PCT/JP2022/024325, filed Jun. 17, 2022, which claims the benefit of Japanese Patent Application No. 2021-132069, filed Aug. 13, 2021 and Japanese Patent Application No. 2022-081074, filed May 17, 2022, all of which are hereby incorporated by reference herein in their entirety.

BACKGROUND OF THE INVENTION

Field of the Invention

The present invention relates to a training technique.

Background Art

As a method for detecting an object from an image using a neural network model, a method using an anchor box is often used, such as the object detection method described in NPL 1. In training in an object detection method using an anchor box, an anchor box with predefined coordinates, width, and height is assigned to a correct answer label including coordinates, width, and height of a region of an object to be detected in an image, and training of parameters of the neural network model is performed such that the same value as the correct answer label is output by performing transformations such as moving the coordinates and scaling the width and height of the anchor box assigned to the correct label. Assignment is performed by calculating an IoU (Intersection over Union) of the correct answer label and the anchor box, and using that value as the degree of similarity, starting from the pair with the highest value.

Although the correct answer label can have any coordinates in the image, the coordinates of the anchor box are discretely defined, and therefore there is an issue of position dependence in which, depending on the positional relationship between the correct answer label and the anchor box, training is not stable with pairs that are far apart from each other.

In response to such a problem, for example, NPL 2 discloses a technique for solving this problem by assigning a plurality of anchor boxes to one correct answer label.

In the method disclosed in NPL 2, while a plurality of anchor boxes are assigned, the upper limit for assignments is constant. For this reason, a problem may arise in that the number of assigned anchor boxes exceeds the maximum number of assignments, and anchor boxes that were originally to be assigned are not assigned. This has resulted in a problem in that the training of the neural network fails and the detection reliability decreases. The present invention provides a technique for improving the training accuracy of a neural network model that detects objects from images.

CITATION LIST

Non Patent Literature

NPL 1: Redmon, Joseph, and Ali Farhadi. "YOLO9000: better, faster, stronger." Proceedings of the IEEE conference on computer vision and pattern recognition. 2017.

NPL 2: Yang, Xue, et al. "Scrdet: Towards more robust detection for small, cluttered and rotated objects." Proceedings of the IEEE/CVF International Conference on Computer Vision. 2019.

SUMMARY OF THE INVENTION

According to the first aspect of the present invention, there is provided a training device comprising: an acquisition unit configured to acquire a degree of similarity between a correct answer region indicating a region of an object in an image and each of a plurality of anchor boxes set in advance in an image; a selection unit configured to select, among the plurality of anchor boxes, an anchor box for which the degree of similarity is greater than or equal to a predetermined threshold, for the correct answer region; and a training unit configured to perform training of a neural network model for detecting the object, based on the correct answer region and the anchor box selected by the selection unit, wherein if a maximum number of anchor boxes have been selected for the correct answer region, the selection unit changes the maximum number of the anchor boxes for the correct answer region based on the degrees of similarity acquired by the acquisition unit for the anchor boxes selected for the correct answer region.

According to the second aspect of the present invention, there is provided an object detection device comprising: an acquisition unit configured to acquire a plurality of detection frames for an object and degrees of reliability of the detection frames, the detection frames and degrees of reliability being output from a neural network model trained by a training device due to an image including the object being input to the neural network model; and an integration unit configured to integrate a first detection frame with the highest degree of reliability in the plurality of detection frames and second detection frames that are fewer in number than the maximum number and do not include the first detection frame, in the plurality of detection frames, wherein the training device comprising: a degree of similarity acquisition unit configured to acquire a degree of similarity between a correct answer region indicating a region of an object in an image and each of a plurality of anchor boxes set in advance in an image; a selection unit configured to select, among the plurality of anchor boxes, an anchor box for which the degree of similarity is greater than or equal to a predetermined threshold, for the correct answer region; and a training unit configured to perform training of a neural network model for detecting the object, based on the correct answer region and the anchor box selected by the selection unit, wherein if a maximum number of anchor boxes have been selected for the correct answer region, the selection unit changes the maximum number of the anchor boxes for the correct answer region based on the degrees of similarity acquired by the degree of similarity acquisition unit for the anchor boxes selected for the correct answer region.

According to the third aspect of the present invention, there is provided a training method to be performed by a training device, the method comprising: acquiring a degree of similarity between a correct answer region indicating a region of an object in an image and each of a plurality of anchor boxes set in advance in an image; selecting, among the plurality of anchor boxes, an anchor box for which the degree of similarity is greater than or equal to a predetermined threshold, for the correct answer region; and performing training of a neural network model for detecting the object, based on the correct answer region and the anchor box selected in the selection, wherein in the selection, if a maximum number of the anchor boxes have been selected for the correct answer region, the maximum number of the anchor boxes for the correct answer region is changed based on the degrees of similarity acquired in the acquisition for the anchor boxes selected for the correct answer region.

According to the fourth aspect of the present invention, there is provided an object detection method to be performed by an object detection device, the method comprising: acquiring a plurality of detection frames for an object and degrees of reliability of the detection frames, the detection frames and the degrees of reliability being output from a neural network model trained by a training device due to an image including the object being input to the neural network model; and integrating a first detection frame with the highest degree of reliability in the plurality of detection frames and second detection frames that are fewer in number than the maximum number and do not include the first detection frame, in the plurality of detection frames, wherein the training device comprising: an acquisition unit configured to acquire a degree of similarity between a correct answer region indicating a region of an object in an image and each of a plurality of anchor boxes set in advance in an image; a selection unit configured to select, among the plurality of anchor boxes, an anchor box for which the degree of similarity is greater than or equal to a predetermined threshold, for the correct answer region; and a training unit configured to perform training of a neural network model for detecting the object, based on the correct answer region and the anchor box selected by the selection unit, wherein if a maximum number of anchor boxes have been selected for the correct answer region, the selection unit changes the maximum number of the anchor boxes for the correct answer region based on the degrees of similarity acquired by the acquisition unit for the anchor boxes selected for the correct answer region.

According to the fifth aspect of the present invention, there is provided a non-transitory computer-readable storage medium for storing a computer program for causing a computer to function as: an acquisition unit configured to acquire a degree of similarity between a correct answer region indicating a region of an object in an image and each of a plurality of anchor boxes set in advance in an image; a selection unit configured to select, among the plurality of anchor boxes, an anchor box for which the degree of similarity is greater than or equal to a predetermined threshold, for the correct answer region; and a training unit configured to perform training of a neural network model for detecting the object, based on the correct answer region and the anchor box selected by the selection unit, wherein if a maximum number of anchor boxes have been selected for the correct answer region, the selection unit changes the maximum number of the anchor boxes for the correct answer region based on the degrees of similarity acquired by the acquisition unit for the anchor boxes selected for the correct answer region.

According to the sixth aspect of the present invention, there is provided a non-transitory computer-readable storage medium for storing a computer program for causing a computer to function as: an acquisition unit configured to acquire a plurality of detection frames for an object and degrees of reliability of the detection frames, the detection frames and degrees of reliability being output from a neural network model trained by a training device due to an image including the object being input to the neural network model; and an integration unit configured to integrate a first detection frame with the highest degree of reliability in the plurality of detection frames and second detection frames that are fewer in number than the maximum number and do not include the first detection frame, in the plurality of detection frames, wherein the training device comprising: a degree of similarity acquisition unit configured to acquire a degree of similarity between a correct answer region indicating a region of an object in an image and each of a plurality of anchor boxes set in advance in an image; a selection unit configured to select, among the plurality of anchor boxes, an anchor box for which the degree of similarity is greater than or equal to a predetermined threshold, for the correct answer region; and a training unit configured to perform training of a neural network model for detecting the object, based on the correct answer region and the anchor box selected by the selection unit, wherein if a maximum number of anchor boxes have been selected for the correct answer region, the selection unit changes the maximum number of the anchor boxes for the correct answer region based on the degrees of similarity acquired by the degree of similarity acquisition unit for the anchor boxes selected for the correct answer region.

Further features of the present invention will become apparent from the following description of exemplary embodiments with reference to the attached drawings.

BRIEF DESCRIPTION OF THE DRAWINGS

FIG. 2A is a flowchart of processing for assigning an anchor box to a correct answer label, performed by an assignment processing unit 121.

FIG. 2B is a flowchart of processing for assigning an anchor box to a correct answer label, performed by the assignment processing unit 121.

FIG. 3 is a flowchart of processing performed by an arithmetic processing unit 120.

FIG. 4A is a diagram showing an example of a correct answer label.

FIG. 4B is a diagram showing an example of anchor boxes.

FIG. 4C is a diagram showing an example of degrees of similarity between a correct answer label and anchor boxes.

FIG. 6A is a diagram showing an example of a detection frame.

FIG. 6B is a diagram showing an example of degrees of reliability of detection frames.

FIG. 6C is a diagram showing an example of degrees of similarity to a detection frame 612-1.

FIG. 7 is a block diagram showing an example of a hardware configuration of a computer device.

FIG. 8A is a diagram showing an example of faces of people in an image of a usage scene.

FIG. 8B is a diagram showing an example of values of center positions and sizes of faces of people.

FIG. 8C is a diagram showing an example of sizes of faces in each image region.

FIG. 8D is a diagram showing an example of reference values for sizes of a face and maximum numbers of anchor boxes.

FIG. 9A is a flowchart of processing for assigning an anchor box to a correct answer label using a second degree of similarity, performed by the assignment processing unit 121.

FIG. 9B is a flowchart of processing for assigning an anchor box to a correct answer label using the second degree of similarity, performed by the assignment processing unit 121.

FIG. 10A is a diagram showing an example of an anchor box.

FIG. 10B is a diagram showing an example of first and second degrees of similarity between the correct answer label and each anchor box.

DESCRIPTION OF THE EMBODIMENTS

Figure 1:
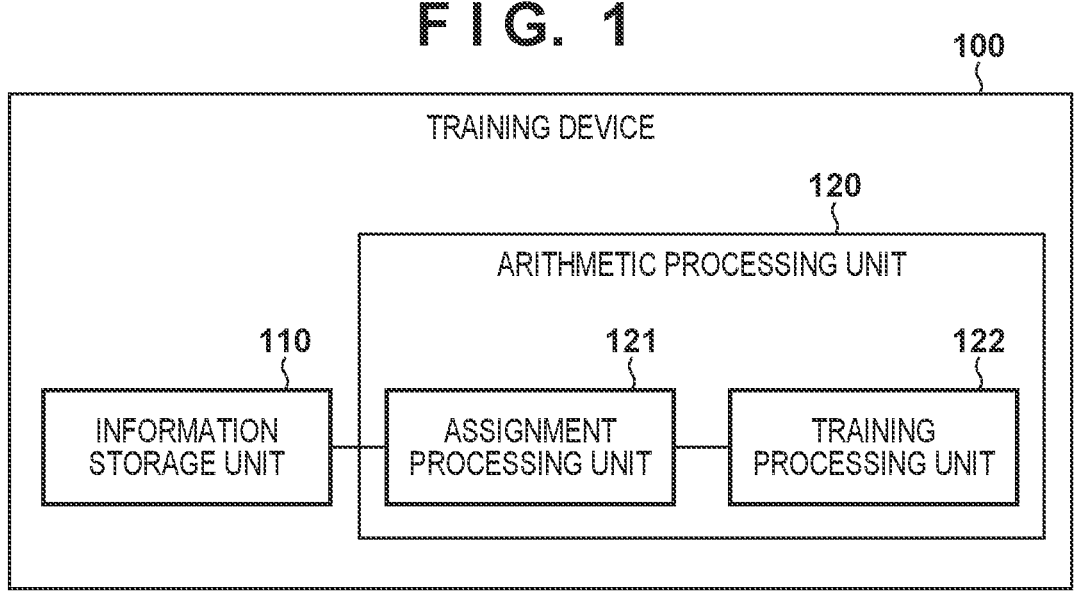
FIG. 1 is a block diagram showing a configuration example of a training device 100.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

In this embodiment, a training device that performs training of a neural network model for detecting a face of a person from an image including the face will be described. A configuration example of the training device 100 according to the present embodiment will be described using the block diagram of FIG. 1.

The information storage unit 110 is a memory device such as an HDD (Hard Disk Drive), an SSD (Solid State Drive), an optical disk, a RAM (Random Access Memory), or a flash memory. The information storage unit 110 stores an OS (operating system), and computer programs and data for causing an arithmetic processing unit 120 to execute or control various types of processing described as being performed by the training device 100. The data stored in the information storage unit 110 includes first information defining a correct answer label indicating a region of a face of a person in an image including the face of the person (training image), and second information defining a plurality of anchor boxes set in advance in the training image including the face of the person. Also, the data stored in the information storage unit 110 includes a similarity degree threshold used in later-described processing and a maximum number of anchor boxes that can be assigned to one correct answer label.

Figures 4A, 4B, 4C:
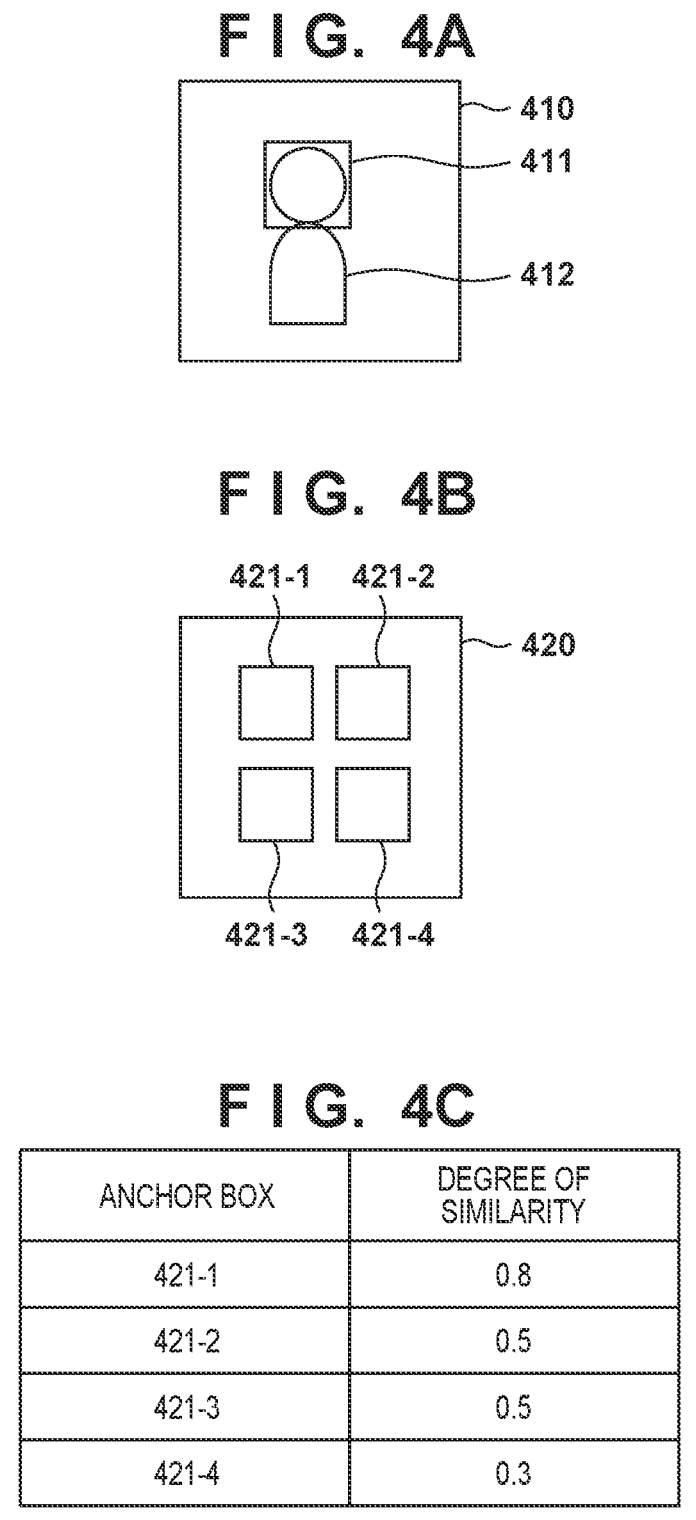

The first information includes, for example, the coordinates, width, and height of the correct answer label (region of a face of a person) in the training image. For example, as illustrated in FIG. 4A, the correct answer label indicates a region 411 of a face of a person 412 in a training image 410 used for training the neural network model, and in this case, the first information includes the coordinates of the region 411 in the training image 410, and the width and height of the region 411. Note that the correct answer label is not limited to a face of a person in an image, but may be any object as long as it is a target object to be detected by the neural network model, and in that case, the first information is information specifying a target object in an image.

The second information includes the coordinates, width, and height of each of the plurality of anchor boxes. For example, as illustrated in FIG. 4B, a plurality of anchor boxes are arranged within a certain range 420 (e.g., a range having the image size of the training image 410), and in FIG.

4B, anchor boxes 421-1, 421-2, 421-3 and 421-4 are arranged. In this case, the second information includes the coordinates, width, and height of each of the anchor boxes 421-1, 421-2, 421-3, and 421-4. Note that the anchor boxes are not limited to a rectangular shape, and their arrangement pattern is not limited to the arrangement pattern illustrated in FIG. 4B.

Also, the information storage unit 110 also stores parameters (weight values, etc.) of the neural network model. Information that will be treated as known information in the following description is also stored in the information storage unit 110.

It is assumed that when an image including a face of a person is input, the neural network model used in this embodiment converts the coordinates, width, and height of the anchor box to the coordinates, width, and height of the region of the face of the person. Note that the neural network model may be any model as long as it detects an object from an image using an anchor box.

The arithmetic processing unit 120 is an electronic circuit such as a CPU (Central Processing Unit). The arithmetic processing unit 120 executes various types of processing using computer programs and data stored in the information storage unit 110. As a result, the arithmetic processing unit 120 not only performs overall control of the operation of the training device 100, but also executes or controls various types of processing described as being performed by the training device 100. Note that the arithmetic processing unit 120 may also be an integrated circuit such as an FPGA (Field Programmable Gate Array). The arithmetic processing unit 120 includes an assignment processing unit 121 and a training processing unit 122.

The assignment processing unit 121 assigns (selects) one or more anchor boxes to each correct answer label in the training image. The processing for assigning an anchor box to a correct answer label, which is performed by the assignment processing unit 121, will be described according to the flowcharts of FIGS. 2A and 2B.

In step S200, the assignment processing unit 121 reads out the first information of each correct answer label in the training image, the second information defining each of the plurality of anchor boxes, the similarity degree threshold, and the maximum number from the information storage unit 110 to an internal memory of the assignment processing unit 121.

In step S201, for each correct answer label (specified by the first information) in the training image, the assignment processing unit 121 obtains the degree of similarity between the correct answer label and each of the plurality of anchor boxes (specified by the second information). The assignment processing unit 121 obtains an IoU (Intersection over Union) of the correct answer label and the anchor box as the degree of similarity between the correct answer label and the anchor box. However, the degree of similarity between the correct answer label and the anchor box is not limited to the IoU of the correct answer label and the anchor box. For example, another similarity degree index such as a GIoU (Generalized Intersection over Union) of the correct answer label and the anchor box may also be used as the "degree of similarity between the correct answer label and the anchor box".

An example of the degrees of similarity between the correct answer label 411 in FIG. 4A and the anchor boxes 421-1 to 421-4 in FIG. 4B is shown in FIG. 4C. As shown in FIG. 4C, the degree of similarity obtained for the anchor box 421-1 is 0.8, the degree of similarity obtained for the anchor box 421-2 and the anchor box 421-3 is 0.5, and the degree of similarity obtained for the anchor box 421-4 is 0.3.

Next, the assignment processing unit 121 performs the processing of step S202 for each correct answer label in the training image. Before starting the processing of step S202, the assignment processing unit 121 first creates an unassigned list in which all anchor boxes are registered for each correct answer label in the training image. Then, the assignment processing unit 121 selects one of the unselected correct answer labels in the training image as a selected correct answer label. Then, the assignment processing unit 121 specifies the anchor box that has the highest degree of similarity to the selected correct answer label among the anchor boxes registered in the unassigned list for the selected correct answer label. Then, the assignment processing unit 121 registers the specified anchor box in the assigned list for the selected correct answer label and deletes the specified anchor box from the unassigned list for the selected correct answer label. As a result, the assignment processing unit 121 assigns, to the selected correct answer label, the anchor box that has the highest degree of similarity to the selected correct answer label among the anchor boxes registered in the unassigned list for the selected correct answer label.

For example, if the correct answer label 411 in FIG. 4A is selected as the selected correct answer label, the anchor box with the highest degree of similarity to the correct answer label 411 among the anchor boxes 421-1 to 421-4 is the anchor box 421-1, as shown in FIG. 4C. However, in this case, the assignment processing unit 121 assigns the anchor box 421-1 to the correct answer label 411. That is, the assignment processing unit 121 registers the anchor box 421-1 registered in the unassigned list for the correct answer label 411 in the assigned list for the correct answer label 411 and deletes the anchor box 421-1 from the unassigned list.

Note that the unassigned list and assigned list for each correct answer label may be held in the internal memory of the arithmetic processing unit 120, or may be held in the information storage unit 110, and the location where it is held is not limited to a specific location.

Next, the assignment processing unit 121 performs the processing of steps S203 to S206 for each correct answer label and each anchor box registered in the unassigned list for the correct answer label. In step S203, the assignment processing unit 121 selects one of the unselected correct answer labels out of all of the correct answer labels as the selected correct answer label, and selects one of the unselected anchor boxes registered in the unassigned list for the selected correct answer label as the selected anchor box. The selection order of anchor boxes is not limited to a specific order, but for example, anchor boxes may be selected in descending order of degree of similarity to the selected correct answer label. Note that if there are two or more anchor boxes that have the same degree of similarity to the selected correct answer label, for example, the anchor box with the smaller index may be selected first.

For example, when the correct answer label 411 in FIG. 4A is selected as the selected correct answer label, the anchor boxes 421-2 to 421-4 are registered in the unassigned list for the correct answer label 411. As shown in FIG. 4C, the degrees of similarity corresponding to the respective anchor boxes 421-2 to 421-4 are "0.5", "0.5", and "0.3", and therefore the anchor boxes 421-2, 421-3, and 421-4 will be selected in the stated order.

Then, the assignment processing unit 121 determines whether or not a degree of similarity S between the selected correct answer label and the selected anchor box is greater than or equal to the similarity degree threshold. As a result of this determination, if the degree of similarity S is greater than or equal to the similarity degree threshold, the processing advances to step S204, and if the degree of similarity S is less than the similarity degree threshold, the processing advances to step S203.

For example, it is assumed that the similarity degree threshold is "0.4". When the correct answer label 411 in FIG. 4A is selected as the selected correct answer label and the anchor box 421-2 is selected as the selected anchor box, a degree of similarity of 0.5 corresponding to the anchor box 421-2 is greater than or equal to the similarity degree threshold, and therefore the processing advances to step S204. Thereafter, when the anchor box 421-3 is selected as the selected anchor box, the degree of similarity corresponding to anchor box 421-3 is 0.5, which is greater than or equal to the similarity degree threshold, and therefore the processing advances to step S204. Thereafter, when the anchor box 421-4 is selected as the selected anchor box, the degree of similarity corresponding to the anchor box 421-4 is 0.3, which is less than the similarity degree threshold, and therefore the processing advances to step S203.

In step S204, the assignment processing unit 121 determines whether or not the number of anchor boxes registered in the assigned list for the selected correct answer label is less than the maximum number. As a result of this determination, if the number of anchor boxes registered in the assigned list for the correct answer label is less than the maximum number, the processing advances to step S206. On the other hand, if the number of anchor boxes registered in the assigned list for the selected correct answer label is not less than the maximum number, the processing advances to step S205.

For example, it is assumed that the maximum number is "2". When the correct answer label 411 in FIG. 4A has been selected as the selected correct answer label and the anchor box 421-2 has been selected as the selected anchor box, the number of anchor boxes registered in the assigned list for the correct answer label 411 is "1" (anchor box 421-1), which is less than the maximum number "2", and therefore the processing advances to step S206. Thereafter, when the anchor box 421-3 is selected as the selected anchor box, the number of anchor boxes registered in the assigned list for the correct answer label 411 is "2" (anchor boxes 421-1, 421-2), which is not less than the maximum number "2", and therefore the processing advances to step S205. Thereafter, when the anchor box 421-4 is selected as the selected anchor box, the number of anchor boxes registered in the assigned list for the correct answer label 411 is "2" (anchor boxes 421-1, 421-2), which is not less than the maximum number "2", and therefore the processing advances to step S205.

In step S205, the assignment processing unit 121 sets the smallest degree of similarity among the degrees of similarity corresponding to the anchor boxes registered in the assigned list for the selected correct answer label as a smallest degree of similarity M, and determines whether or not a difference A between the degree of similarity S and the smallest degree of similarity M is less than or equal to a specified value. The difference $\Delta$ is, for example, $\Delta=|S-M|$. As a result of such determination, if the difference A is less than or equal to the specified value, the processing advances to step S206, and if the difference $\Delta$ is greater than the specified value, the processing advances to step S203.

In step S206, the assignment processing unit 121 registers the selected anchor box registered in the unassigned list for the selected correct answer label to the assigned list for the selected correct answer label, and deletes the selected anchor box from the unassigned list. As a result, the assignment processing unit 121 assigns the selected anchor box to the selected correct answer label.

For example, it is assumed that the correct answer label 411 in FIG. 4A is selected as the selected correct answer label. At this time, the anchor box 421-1 and the anchor box 421-2 are registered in the assigned list for the correct answer label 411, and the smallest degree of similarity M is 0.5. If the anchor box 421-3 is selected as the selected anchor box, the degree of similarity corresponding to the anchor box 421-3 is 0.5, and if the specified value=0 holds true, the difference A from the smallest degree of similarity M=0.5 is less than or equal to the specified value, and therefore the processing advances to step S206. Then, the anchor box 421-3 registered in the unassigned list for the correct answer label 411 is registered in the assigned list for the correct answer label 411, and the anchor box 421-3 is deleted from the unassigned list. As a result, the anchor box 421-3 is assigned to the correct answer label 411.

After the processing of steps S203 to S206 is performed for each correct answer label and each of the anchor boxes registered in the unassigned list for the correct answer label, the processing proceeds to step S207.

In step S207, the assignment processing unit 121 assigns the anchor box registered in the unassigned list for the selected correct answer label to the background. For example, if the correct answer label 411 in FIG. 4A is selected as the selected correct answer label, the anchor box 421-4 will remain in the unassigned list for the correct answer label as described above, and therefore the anchor box 421-4 will be assigned to the background.

In step S208, the assignment processing unit 121 outputs each correct answer label in the training image, the anchor boxes registered in the assigned list for the correct answer label, and the anchor boxes assigned to the background to the training processing unit 122.

The training processing unit 122 performs the above-described training processing of the neural network model based on the correct answer labels and the anchor boxes received from the assignment processing unit 121. For example, using the training method described in NPL 1, the training processing unit 122 performs the above-described training processing such that the anchor boxes assigned to the correct answer labels are converted to the correct answer labels, and such that the anchor boxes that are not assigned to the correct answer labels become the background. In this training processing, the error between the converted anchor box and the correct answer label is obtained by inputting the training image into the neural network model, and the parameters of the neural network model are updated based on the obtained error.

In this manner, in this embodiment, when the maximum number of anchor boxes have been assigned to a correct answer label, one or more anchor boxes are assigned to the correct answer label from the anchor boxes that have not yet been assigned to a correct answer label, based on the degree of similarity obtained for the anchor boxes assigned to the correct answer label and the degree of similarity obtained for the anchor boxes that have not yet been assigned to the correct answer label. This makes it possible to solve the problem of "the anchor boxes that were originally to be assigned not being assigned due to the number of anchor boxes assigned to the correct answer label exceeding the maximum number". However, it is possible to solve the problem in which the training of the neural network model fails and the detection reliability decreases.

Modified Example 1

The following processing may also be adopted as the processing for determining the anchor box to be assigned to the correct answer label in the training image (step S202). That is, the total sum of degrees of similarity is obtained for each combination of anchor boxes assigned to a group of correct answer labels in a training image, and the combination of anchor boxes for which the total sum of degrees of similarity is the largest is determined using an algorithm such as the Hungarian algorithm or the primal dual method.

Modified Example 2

The maximum number of anchor boxes that can be assigned to one correct answer label stored in the information storage unit 110 may also be changed for each region of the training image. For example, when adjusting a neural network model that has already been trained by the training device 100 according to the scene of use, the training device 100 will perform training again using an image captured in the scene of use. At this time, the maximum number of anchor boxes that can be assigned may be increased the smaller the size of a face of a person is in the image of the scene of use. An example of changing the maximum number of assignable anchor boxes will be described with reference to FIGS. 8A to 8D. If the scene of use is fixed, the center position (x, y) and size S of a face of a person in the image can be expressed as S=ax+by+c using variables a, b, and c, and the variables a, b, and c can be determined using the least squares method as long as there are at least three combinations of the center position (x, y) and size S of the face of the person. The variables a, b, and c may also be determined from a combination of the center positions and sizes of at least two sets of faces of people, with a=0 or b=0. The combination of the center position (x, y) and size S of a face of a person may also be designated from the image of a scene used by the user, or extracted from a set of face detection results obtained from a group of images of the scene of use. As shown in FIG. 8A, when the sizes of people that can be included in the image are those of a person 800, a person 801, and a person 802, the center position and size of the face of each person can be expressed as shown in FIG. 8B. Calculating the variables a, b, and c from this results in a=0.1, b=0.2, and c=15. The size of a person's face may be expressed in pixels, the size in the real world, or a numerical value standardized based on the size of an image or the like. When calculating the sizes of the faces of the people in each image region using a=0.1, b=0.2, and c=15, as shown in FIG. 8C, the image region is divided into an image region 803 where the size S of a face of a person is 15 or more and less than 25, an image region 804 where the size S of a face of a person is 25 or more and less than 35, and an image region 805 where the size S of a face of a person is 35 or more and less than 45. As shown in FIG. 8D, based on the size of the object and the reference value for the maximum number of anchor boxes, the maximum number for the image region 803 is set to "4", the maximum number for the image region 804 is set to "3", and the maximum number for the image region 805 is set to "2". The reference values for the size of the object and the maximum number of anchor boxes are determined by the user based on the detection accuracy of the trained neural network model and the width and height of the anchor box being used. According to this, the detection accuracy of the neural network model is improved by assigning more anchor boxes to small objects that are more difficult to detect.

Modified Example 3

The following processing may also be adopted as the correct answer label assignment processing (step S205 and step S206) in the case where the anchor box assignment upper limit is exceeded. The processing for assigning anchor boxes to correct answer labels using this processing will be described with reference to the flowcharts of FIGS. 9A and 9B. Description of points similar to those of the processing for assigning anchor boxes to correct answer labels described above will be omitted.

If the smallest degree of similarity among the assigned anchor boxes matches the degree of similarity in step S900, the processing advances to step S901. If they do not match, the processing advances to step S203.

In step S901, a second degree of similarity is calculated for two anchor boxes that have the same degree of similarity, and the anchor box with the highest second degree of similarity is set as the correct answer label and the information on the anchor box registered in the assigned list is updated.

The second degree of similarity may also be the center distance between the anchor box and the correct answer label, the difference in size between the anchor box and the correct answer label, or the sum of the center distance and the difference in size between the anchor box and the correct answer label. The difference in size is, for example, the squared error between the width and height. Also, these three types of values indicate that the smaller the value is, the higher the degree of similarity is. An example of the second degree of similarity will be described with reference to FIGS. 10A and 10B. As shown in FIG. 10A, an anchor box 1000 and an anchor box 1001 are anchor boxes that have the same width and height and different center coordinates. An anchor box 1002 and an anchor box 1003 are anchor boxes that have the same area and center coordinates, but different widths and heights. If the degrees of similarity between the correct answer label 411 and the respective anchor boxes are calculated as shown in FIG. 10B, the first degrees of similarity of the anchor box 1000 and the anchor box 1001 are equal. Accordingly, when the second degree of similarity is the center distance or the sum of the center distance and the difference in size, the second degree of similarity of the anchor box 1000 is "0" or "1", and the second degree of similarity of the anchor box 1001 is "0.5" or "1.5", and therefore the anchor box 1000 with the smaller value and higher degree of similarity is selected. Furthermore, the first degrees of similarity of the anchor box 1002 and the anchor box 1003 are equal. Accordingly, if the second degree of similarity is the difference in size or the sum of the center distance and the difference in size, the second degree of similarity of the anchor box 1002 is "1.9", and the second degree of similarity of the anchor box 1003 is "1.3", and therefore the anchor box 1003 is selected. By determining the anchor box to be assigned using the second degree of similarity for each anchor box, it is possible to select an anchor box that is closer to the correct answer label in the situation of the anchor boxes shown in FIG. 10A. According to this, the detection accuracy of the neural network model can be improved by assigning only the anchor box that has a higher degree of similarity to the correct answer label.

Second Embodiment

In this embodiment, the difference from the first embodiment will be described, and unless otherwise mentioned below, it is assumed that this embodiment is the same as the first embodiment. This embodiment describes an object detection device that obtains a final face detection result by integrating face detection results output from the neural network model due to an "image including a face of a person" being input to a neural network model trained by the training device 100 according to the first embodiment. Note that if the neural network model has been trained to detect objects other than faces of people, the object detection device obtains the final object detection result by integrating the object detection results output from the neural network model due to an "image including an object" being input.

First, a configuration example of an object detection device 500 according to this embodiment will be described with reference to the block diagram of FIG. 5. The object detection device 500 may be the same device as the training device 100 according to the first embodiment (one device is incorporated as a functional part of the other device), or may be a separate device. That is, as long as the object detection device 500 can utilize the neural network model trained by the training device 100, the configuration of the system including the training device 100 and the object detection device 500 may be any configuration.

An information storage unit 510 is a memory device such as an HDD, SSD, optical disk, RAM, or flash memory. The information storage unit 510 stores an OS and computer programs and data for causing an arithmetic processing unit 520 to execute or control various types of processing described as being performed by the object detection device 500. The data stored in the information storage unit 510 includes an image including a face of a person, and a first similarity degree threshold and a second similarity degree threshold (lower than the first similarity degree threshold) used in processing described below. Also, the data stored in the information storage unit 510 includes the "maximum number of anchor boxes that can be assigned to one correct answer label" described in the first embodiment, and the neural network model trained by the training device 100.

The arithmetic processing unit 520 is an electronic circuit such as a CPU. The arithmetic processing unit 520 executes various types of processing using computer programs and data stored in the information storage unit 510. As a result, the arithmetic processing unit 520 performs overall control of the operation of the object detection device 500, and executes or controls various types of processing described as being performed by the object detection device 500. Note that the arithmetic processing unit 520 may also be an integrated circuit such as an FPGA. The arithmetic processing unit 520 includes an object detection unit 521 and an integration processing unit 522.

The processing performed by the arithmetic processing unit 120 (integration processing for integrating detection frames of a face of a person obtained from images using a neural network model) will be described according to the flowchart of FIG. 3.

In step S301, the object detection unit 521 reads out an image including a face of a person, the first and second similarity degree thresholds, the "maximum number of anchor boxes that can be assigned to one correct answer label", and the trained neural network model from the information storage unit 110 to the internal memory of the object detection unit 521. Then, the object detection unit 521 inputs the image to the neural network model and operates the neural network model to acquire detection results output from the neural network model (the method described in NPL 1, etc.). The detection results include the frames (detection frames) of a plurality of detection regions detected as regions of a face of a person in the image, and degrees of reliability indicating the probabilities that the detection regions are regions of a face (degrees of reliability of the detection frames).

The integration processing unit 522 acquires the detection results obtained by the object detection unit 521. Then, the integration processing unit 522 registers all of the detection frames included in the detection results in the unprocessed list. In order to provide a specific description below, a case will be described in which, as shown in FIG. 6A, the detection frames 612-1, 612-2, and 612-3 are obtained as detection frames for a face 611 of a person in an image 610 using a neural network model. Also, as shown in FIG. 6B, it is assumed that 0.9, 0.7, and 0.7 are obtained as the respective degrees of reliability of the detection frames 612-1, 612-2, and 612-3.

In step S302, the integration processing unit 522 sorts the detection frames 612-1, 612-2, and 612-3 registered in the unprocessed list in descending order of degree of reliability. Note that the sorting order is not limited to descending order, and sorting may also be omitted.

In step S304, the integration processing unit 522 reads out the detection frame 612-1, which is the detection frame with the highest degree of reliability, from the unprocessed list as the first detection frame, and deletes the detection frame 612-1 from the unprocessed list. Then, the integration processing unit 522 initializes an integration count, which is a counter for counting the number of detection frames to be integrated into the first detection frame, to 0.

Then, the integration processing unit 522 performs a series of processing of steps S305 to S307 for each of the detection frames 612-2 and 612-3 registered in the unprocessed list.

In step S305, the integration processing unit 522 acquires the detection frame with the highest degree of reliability from the unprocessed list as a second detection frame, and deletes the second detection frame from the unprocessed list. Note that if there are two or more detection frames with the highest degree of reliability in the unprocessed list, the detection frame with the smaller index may be selected first, for example. Then, the integration processing unit 522 obtains the degree of similarity between the second detection frame and the first detection frame. The integration processing unit 522 obtains an IoU (Intersection over Union) of the second detection frame and the first detection frame as the degree of similarity between the second detection frame and the first detection frame. However, similarly to the first embodiment, the degree of similarity is not limited to an IoU, and another degree of similarity index such as a GIoU (Generalized Intersection over Union) may also be used. Then, the integration processing unit 522 determines whether or not the degree of similarity between the second detection frame and the first detection frame is greater than or equal to the first similarity degree threshold.

As a result of this determination, if the degree of similarity between the second detection frame and the first detection frame is greater than or equal to the first similarity degree threshold, the processing advances to step S307, and if the degree of similarity between the second detection frame and the first detection frame is less than the first similarity degree threshold, the processing advances to step S306.

If the detection frame 612-2 is acquired as the second detection frame, the degree of similarity between the first detection frame and the second detection frame is 0.9, as shown in FIG. 6C. Here, if the first similarity degree threshold is 0.9, the degree of similarity between the first detection frame and the second detection frame is greater than or equal to the first similarity degree threshold, and therefore the processing advances to step S307.

If the detection frame 612-3 is acquired as the second detection frame, the degree of similarity between the first detection frame and the second detection frame is 0.8, as shown in FIG. 6C. Here, if the first similarity degree threshold is 0.9, the degree of similarity between the first detection frame and the second detection frame is less than the first similarity degree threshold, and therefore the processing advances to step S306.

In step S306, the integration processing unit 522 determines whether or not the condition that "the integration count is less than the "maximum number of anchor boxes that can be assigned to one correct answer label" and the degree of similarity between the second detection frame and the first detection frame is greater than or equal to the second similarity degree threshold" is satisfied.

If it is determined that the condition is satisfied, the processing advances to step S307, and if the condition is not satisfied, the processing advances to step S305. In this embodiment, if the detection frame 612-3 is the target of step S306 and the second similarity degree threshold is 0.5, the condition is satisfied, and therefore the processing advances to step S307.

In step S307, the integration processing unit 522 performs processing for integrating the first detection frame and the second detection frame, whereby the integrated detection frames become a new first detection frame. Various types of integration processing can be applied to the integration processing of the first detection frame and the second detection frame, and there is no limitation to specific integration processing. For example, as with Soft-NMS (Non-Maximum Suppression), two detection frames may be integrated by obtaining a weighted average of coordinates, width, and height using the degrees of reliability of the detection frames as weights. That is, the sums of the results of weighting the coordinates, width, and height of the first detection frame by the degree of reliability of the first detection frame, and the results of weighting the coordinates, width, and height of the second detection frame by the degree of reliability of the second detection frame may also be set as the new coordinates, width, and height of the first detection frame. Then, the integration processing unit 522 registers the second detection frame in the processed list and increments the integration count by one.

Through such processing, the first detection frame can be integrated with not only a detection frame whose degree of similarity to the first detection frame is greater than or equal to the first similarity degree threshold, but also a detection frame whose degree of similarity to the first detection frame is greater than or equal to the second similarity degree threshold, as long as the integration count is less than a certain number.

Then, the integration processing unit 522 outputs the integrated detection frame as the final "detection frame of a face of a person in the image". The output destination and output mode of the integrated detection frames are not limited to specific output destinations and specific output modes. For example, an image including a face of a person may also be displayed on a display device that the object detection device 500 has or that is capable of communicating with the object detection device 500, and the integrated detection frames may be displayed superimposed on the image.

In this manner, in this embodiment, it is possible to suppress an increase in erroneous detection by suppressing an increase in the size of the detection frame due to the training device 100 assigning a plurality of anchor boxes to one correct answer label, and it is possible to realize a reduction of deterioration of detection accuracy while eliminating position dependence.

Third Embodiment

Figure 5:
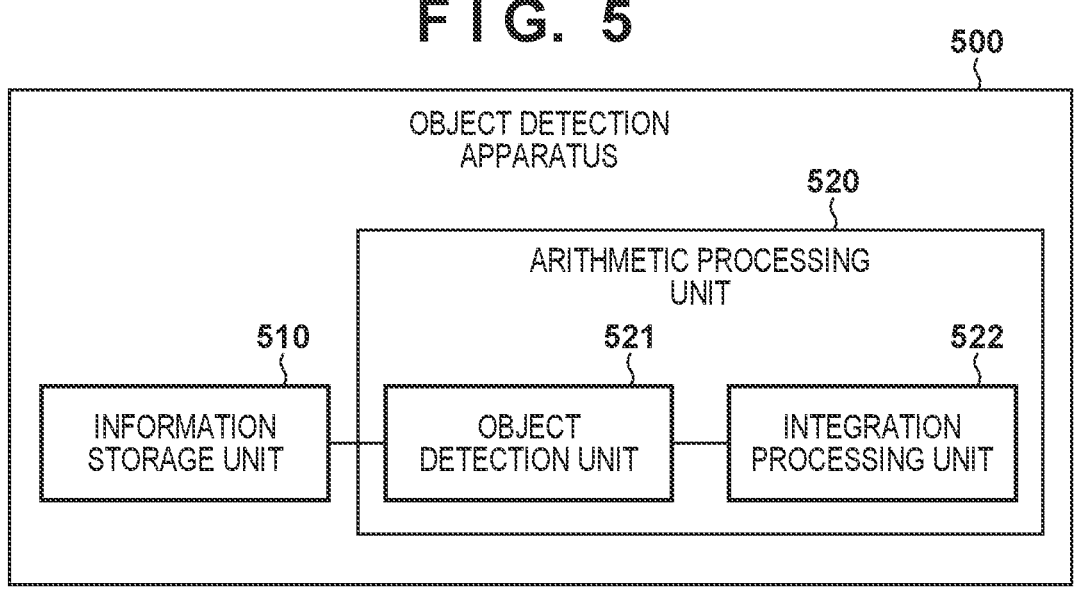
FIG. 5 is a block diagram showing a configuration example of an object detection device 500.

In each of the above-described embodiments, each functional unit of the training device 100 shown in FIG. 1 and each functional unit of the object detection device 500 shown in FIG. 5 have been described as being implemented as hardware. However, the assignment processing unit 121, the training processing unit 122, the object detection unit 521, and the integration processing unit 522 may also be implemented as software (computer program). In this case, a computer device that has a memory that functions as the information storage unit 110 or can access the memory, and is capable of executing a computer program for realizing the respective functions of the assignment processing unit 121 and the training processing unit 122 can be applied to the training device 100. Also, a computer device that has a memory that functions as the information storage unit 510 or can access the memory, and is capable of executing a computer program for realizing the respective functions of the object detection unit 521 and the integration processing unit 522 can be applied to the object detection device 500.

Figure 7:
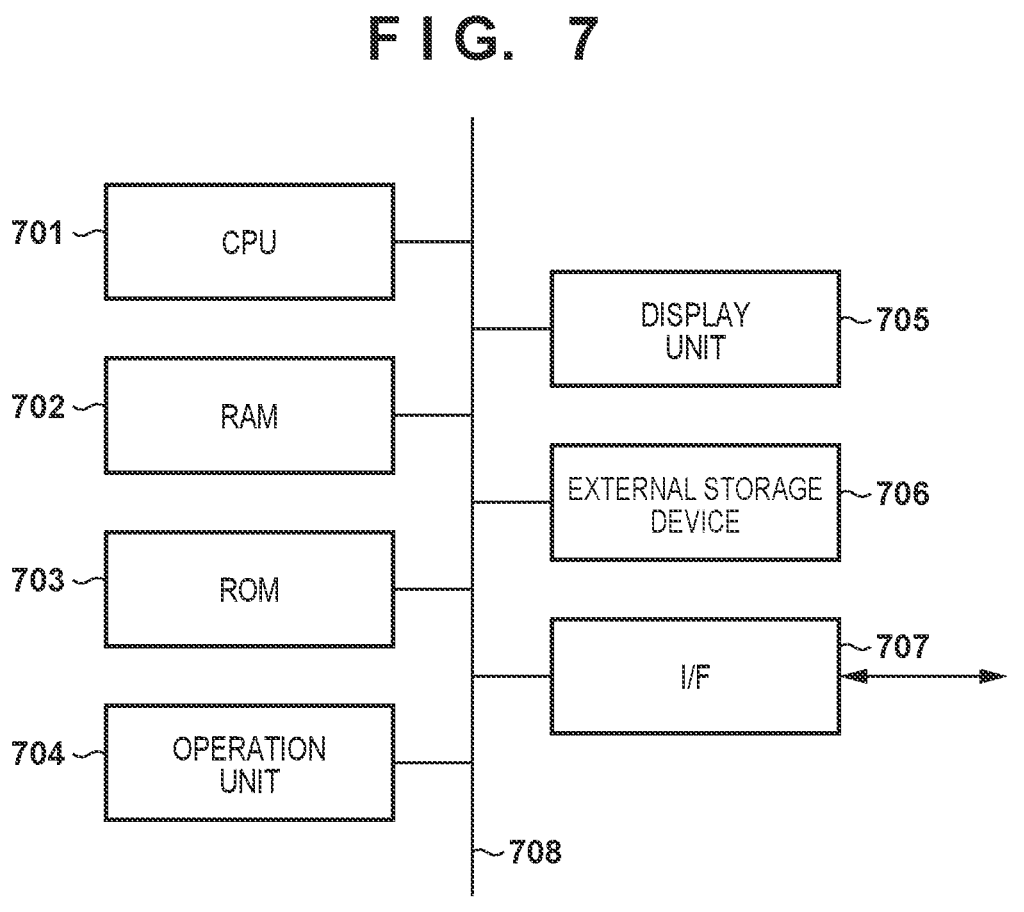

An example of a hardware configuration of a computer device that can be applied to such a training device 100 and an object detection device 500 will be described using the block diagram of FIG. 7. Note that the hardware configuration example shown in FIG. 7 is merely an example.

A CPU 701 executes various types of processing using computer programs and data stored in a RAM 702 and a ROM 703. As a result, the CPU 701 performs overall control of the operation of the computer device, and executes or controls the various types of processing described above as being performed by the training device 100 and the object detection device 500.

The RAM 702 has an area for storing computer programs and data loaded from the ROM 703 or external storage device 706, and an area for storing data received from the outside via an OF (interface) 707. Furthermore, the RAM 702 has a work area used by the CPU 701 when executing various types of processing. In this way, the RAM 702 can provide various areas as appropriate.

The ROM 703 stores setting data for the computer device, computer programs and data relating to starting up the computer device, computer programs and data relating to the basic operations of the computer device, and the like.

The operation unit 704 is a user interface such as a keyboard, mouse, touch panel, or the like, and can be operated by the user to input various instructions to the CPU 701. For example, the user can operate the operation unit 704 to input to the CPU 701 an instruction designating a training image, a training start instruction, an instruction designating an image in which an object is to be detected, an object detection state instruction, and the like.

The display unit 705 has a display screen such as a liquid crystal screen or a touch panel screen, and displays the processing results obtained by the CPU 701 in the form of images, text, and the like. For example, the display unit 705 displays a training image, an image in which an object is to be detected, a detection frame, information regarding the detected object, and the like. Note that the display unit 705 may also be a projection device such as a projector that projects images and text.

The external storage device 706 is a large-capacity information storage device such as a hard disk drive device. The external storage device 706 stores computer programs and data for causing the CPU 701 to execute or control the various types of processing described as being performed by the OS, the training device 100, and the object detection device 500. The data stored in the external storage device 706 includes the above-mentioned first information, second information, similarity degree threshold, maximum number of anchor boxes that can be assigned to one correct answer label, trained neural network model (parameters), training image including a face of a person, image in which a face of a person is to be detected, first similarity degree threshold, second similarity degree threshold, and the like.

Computer programs and data stored in the external storage device 706 are loaded into the RAM 702 as appropriate under the control of the CPU 701 and are subject to processing by the CPU 701. Note that the information storage unit 110 and the information storage unit 510 described above can be implemented using the RAM 702, the external storage device 706, or a combination thereof.

The I/F 707 is a communication interface for performing data communication with an external device via a network such as a LAN or the Internet. For example, the computer device may acquire an image captured by an image capture device via the I/F 707, and store the acquired image in the RAM 702 or the external storage device 706 as an "image in which object detection is to be performed by the object detection device 500". Also, for example, if the first information, the second information, the similarity degree threshold, the maximum number of anchor boxes that can be assigned to one correct answer label, the trained neural network model (parameters), the training image including a face of a person, the image in which a face of a person is to be detected, the first similarity degree threshold, the second similarity degree threshold, and the like are stored in an external device, the computer device may acquire these pieces of information via the I/F 707 and store the acquired information in the RAM 702 or the external storage device 706.

Note that the CPU 701, the RAM 702, the ROM 703, the operation unit 704, the display unit 705, the external storage device 706, and the I/F 707 are all connected to a system bus 708.

Also, in this embodiment, a case has been described in which the training device 100 and the object detection device 500 are implemented with one computer device, but the training device 100 and the object detection device 500 may also be implemented with a plurality of computer devices.

Also, the numerical values, processing timing, processing order, main constituent of processing, transmission destinations/transmission sources/storage locations of data (information), and the like used in each of the above-described embodiments and modifications are examples for the purpose of specific description and are not intended to be limited to this one example.

Also, some or all of the embodiments and modified examples described above may be used in combination as appropriate. Also, some or all of the embodiments and modified examples described above may be selectively used.

According to the configuration of the present invention, it is possible to improve the training accuracy of a neural network model that detects an object from an image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A training device comprising:

a processor; and a memory, including instructions stored thereon, which when executed by the processor causes the training device to:

acquire a degree of similarity between a correct answer region indicating a region of an object in an image and each of a plurality of anchor boxes set in advance in an image;

select, among the plurality of anchor boxes, one or more anchor boxes for which the degree of similarity is greater than or equal to a predetermined threshold, for the correct answer region; and perform training of a neural network model for detecting the object, wherein the training is performed by inputting the image into the neural network model, obtaining an error between the correct answer region and the one or more anchor boxes selected for the correct answer region, and updating one or more parameters of the neural network model based on the obtained error, wherein if a number of the one or more anchor boxes selected for the correct answer region reaches a maximum number, the maximum number of anchor boxes selectable for the correct answer region is changed based on the degrees of similarity acquired for the one or more anchor boxes selected for the correct answer region.

2. The training device according to claim 1, wherein if the maximum number of anchor boxes have been selected for the correct answer region, the maximum number of the anchor boxes for the correct answer region is changed based on the degrees of similarity acquired for the one or more anchor boxes selected for the correct answer region and the degree of similarity acquired for an anchor box that has not yet been selected for the correct answer region.

3. The training device according to claim 2, wherein the instructions, when executed by the processor, further cause the training device to:

if the maximum number of anchor boxes have been selected for the correct answer region, select, for the correct answer region, among the anchor boxes that have not yet been selected for the correct answer region, an anchor box with a degree of similarity whose difference from the smallest degree of similarity among the degrees of similarity of the one or more anchor boxes selected for the correct answer region is less than or equal to a specified value.

4. The training device according to claim 2, wherein the instructions, when executed by the processor, further cause the training device to:

obtain a total sum of degrees of similarity for each combination of anchor boxes selected for a group of correct answer regions in an image, and determine a combination of anchor boxes for which the total sum is the largest.

5. The training device according to claim 1, wherein the training is performed such that each of the one or more anchor boxes selected for the correct answer region is converted into the correct answer region, and such that an anchor box that has not been selected for the correct answer region becomes a background region.

6. The training device according to claim 1, wherein the instructions, when executed by the processor, further cause the training device to:

obtain an IoU (Intersection over Union) of the correct answer region and each of the plurality of anchor boxes as the degree of similarity.

7. The training device according to claim 1, wherein the instructions, when executed by the processor, further cause the training device to:

obtain a GIoU (Generalized Intersection over Union) of the correct answer region and each of the plurality of anchor boxes as the degree of similarity.

8. The training device according to claim 1, wherein the instructions, when executed by the processor, further cause the training device to:

change the maximum number of the one or more anchor boxes based on the size of the object in the image.

9. The training device according to claim 8, wherein the maximum number of the one or more anchor boxes is changed based on the size of the object in the image and a predetermined reference value determined such that the smaller the size of the object in the image is, the larger the maximum number of the one or more anchor boxes is.

10. The training device according to claim 2, wherein the instructions, when executed by the processor, further cause the training device to:

acquire a second degree of similarity between the correct answer region and each of the plurality of anchor boxes, and if the difference between the degree of similarity acquired for each of the one or more anchor boxes selected for the correct answer region and the degree of similarity acquired for the anchor box that has not yet been selected for the correct answer region is less than or equal to a specified value select the anchor box that has not yet been selected based on the second degree of similarity.

11. The training device according to claim 10, wherein the second degree of similarity is a degree of similarity obtained based on at least one of a center distance between the correct answer region and each of the plurality of anchor boxes and a difference in size between the correct answer region and each of the plurality of anchor boxes.

12. The training device according to claim 10, wherein the second degree of similarity is the sum of a distance between a center of the correct answer region and a center of each of the plurality of anchor boxes and a difference in size between the correct answer region and each of the plurality of anchor boxes.

13. An object detection device comprising:
a processor; and
a memory, including instructions stored thereon, which when executed by the processor causes the object detection device to:
acquire a plurality of detection frames for an object and degrees of reliability of the detection frames, the detection frames and degrees of reliability being output from a neural network model trained by a training device due to an image including the object being input to the neural network model; and
integrate a first detection frame with the highest degree of reliability in the plurality of detection frames and second detection frames that are fewer in number than a maximum number and do not include the first detection frame, in the plurality of detection frames,
wherein the training device comprises:
  a processor; and
  a memory, including instructions stored thereon, which when executed by the processor causes the training device to:
  acquire a degree of similarity between a correct answer region indicating a region of an object in an image and each of a plurality of anchor boxes set in advance in an image;
  select, among the plurality of anchor boxes, one or more anchor boxes for which the degree of similarity is greater than or equal to a predetermined threshold, for the correct answer region; and
  perform training of a neural network model for detecting the object, wherein the training is performed by inputting the image into the neural network model, obtaining an error between the correct answer region and the one or more anchor boxes selected for the correct answer region, and updating one or more parameters of the neural network model based on the obtained error,
  wherein if a number of the one or more anchor boxes selected for the correct answer region reaches a maximum number, the maximum number of anchor boxes selectable for the correct answer region is changed based on the degrees of similarity acquired for the one or more anchor boxes selected for the correct answer region.

14. The object detection device according to claim 13, wherein the instructions, when executed by the processor, further cause the object detection device to:

integrate a second detection frame for which the degree of similarity to the first detection frame is greater than or equal to a first similarity degree threshold, into the first detection frame.

15. The object detection device according to claim 14, wherein the instructions, when executed by the processor, further cause the object detection device to:
if the number of detection frames integrated into the first detection frame is less than the maximum number, integrate, into the first detection frame, a second detection frame for which the degree of similarity to the first detection frame is smaller than the first similarity degree threshold and greater than or equal to a second similarity degree threshold, among the detection frames for which the degree of similarity to the first detection frame is less than the first similarity degree threshold.

16. A training method to be performed by a training device, the method comprising:
acquiring a degree of similarity between a correct answer region indicating a region of an object in an image and each of a plurality of anchor boxes set in advance in an image;
selecting, among the plurality of anchor boxes, one or more anchor boxes for which the degree of similarity is greater than or equal to a predetermined threshold, for the correct answer region;
performing training of a neural network model for detecting the object, wherein the training is performed by inputting the image into the neural network model, obtaining an error between the correct answer region and the one or more anchor boxes selected in the selection, and updating one or more parameters of the neural network model based on the obtained error; and
determining that a number of the one or more anchor boxes selected for the correct answer region has reached a maximum number, and changing the maximum number of the anchor boxes selectable for the correct answer region based on the degrees of similarity acquired in the acquisition for the one or more anchor boxes selected for the correct answer region.

17. An object detection method to be performed by an object detection device, the method comprising:
acquiring a plurality of detection frames for an object and degrees of reliability of the detection frames, the detection frames and the degrees of reliability being output from a neural network model trained by a training device due to an image including the object being input to the neural network model; and
integrating a first detection frame with the highest degree of reliability in the plurality of detection frames and second detection frames that are fewer in number than a maximum number and do not include the first detection frame, in the plurality of detection frames, wherein the training device comprises:
a processor; and
a memory, including instructions stored thereon, which when executed by the processor causes the training device to:
acquire a degree of similarity between a correct answer region indicating a region of an object in an image and each of a plurality of anchor boxes set in advance in an image;
select, among the plurality of anchor boxes, one or more anchor boxes for which the degree of similarity is greater than or equal to a predetermined threshold, for the correct answer region; and perform training of a neural network model for detecting the object, wherein the training is performed by inputting the image into the neural network model, obtaining an error between the correct answer region and the one or more anchor boxes selected for the correct answer region, and updating one or more parameters of the neural network model based on the obtained error, wherein if a number of the one or more anchor boxes selected for the correct answer region reaches a maximum number, the maximum number of anchor boxes selectable for the correct answer region is changed based on the degrees of similarity acquired for the one or more anchor boxes selected for the correct answer region.

18. A non-transitory computer-readable storage medium for storing a computer program for causing a computer to:

acquire a degree of similarity between a correct answer region indicating a region of an object in an image and each of a plurality of anchor boxes set in advance in an image;

select, among the plurality of anchor boxes, one or more anchor boxes for which the degree of similarity is greater than or equal to a predetermined threshold, for the correct answer region; and perform training of a neural network model for detecting the object, wherein the training is performed by inputting the image into the neural network model, obtaining an error between the correct answer region and the one or more anchor boxes, and updating one or more parameters of the neural network model based on the obtained error, wherein if a number of the one or more anchor boxes selected for the correct answer region reaches a maximum number, the maximum number of anchor boxes selectable for the correct answer region is changed based on the degrees of similarity acquired for the one or more anchor boxes selected for the correct answer region.

19. A non-transitory computer-readable storage medium for storing a computer program for causing a computer to:

acquire a plurality of detection frames for an object and degrees of reliability of the detection frames, the detection frames and degrees of reliability being output from a neural network model trained by a training device due to an image including the object being input to the neural network model; and integrate a first detection frame with the highest degree of reliability in the plurality of detection frames and second detection frames that are fewer in number than a maximum number and do not include the first detection frame, in the plurality of detection frames, wherein the training device comprises:

a processor; and a memory, including instructions stored thereon, which when executed by the processor causes the training device to:

acquire a degree of similarity between a correct answer region indicating a region of an object in an image and each of a plurality of anchor boxes set in advance in an image;

select, among the plurality of anchor boxes, one or more anchor boxes for which the degree of similarity is greater than or equal to a predetermined threshold, for the correct answer region; and perform training of a neural network model for detecting the object, wherein the training is performed by inputting the image into the neural network model, obtaining an error between the correct answer region and the one or more anchor boxes selected for the correct answer region, and updating one or more parameters of the neural network model based on the obtained error, wherein if a number of anchor boxes selected for the correct answer region reaches a maximum number, the maximum number of anchor boxes selectable for the correct answer region is changed based on the degrees of similarity acquired for the one or more anchor boxes selected for the correct answer region.

* * * * *